(12) United States Patent
Uhlmann et al.

(10) Patent No.: US 7,346,799 B2
(45) Date of Patent: Mar. 18, 2008

(54) SYSTEMS AND METHODS FOR RECOVERING AND BACKING UP DATA

(75) Inventors: Carolina P. Uhlmann, Seattle, WA (US); Eric A. Herrmann, Snohomish, WA (US); Dianne C. Thompson, Bellevue, WA (US); Janet L. Schneider, Bellevue, WA (US); Patrick M. Simonich, Kent, WA (US)

(73) Assignee: EMC Corporation, Hopkinton, MA (US)

( * ) Notice: Subject to any disclaimer, the term of this patent is extended or adjusted under 35 U.S.C. 154(b) by 645 days.

(21) Appl. No.: 10/935,551

(22) Filed: Sep. 7, 2004

(65) Prior Publication Data
US 2006/0053332 A1  Mar. 9, 2006

(51) Int. Cl.
*G06F 11/00* (2006.01)
(52) U.S. Cl. .............................. 714/2; 714/6
(58) Field of Classification Search ............... 714/2, 714/6, 15
See application file for complete search history.

(56) References Cited

U.S. PATENT DOCUMENTS

| | | | |
|---|---|---|---|
| 6,865,655 | B1 | 3/2005 | Andersen |
| 6,910,112 | B2 | 6/2005 | Berkowitz et al. |
| 6,948,038 | B2 | 9/2005 | Berkowitz et al. |
| 7,162,599 | B2 | 1/2007 | Berkowitz et al. |
| 2003/0182301 | A1 | 9/2003 | Patterson et al. |
| 2004/0010487 | A1* | 1/2004 | Prahlad et al. ............... 707/1 |
| 2004/0236916 | A1* | 11/2004 | Berkowitz et al. .......... 711/162 |
| 2004/0250033 | A1* | 12/2004 | Prahlad et al. ............... 711/162 |
| 2005/0015663 | A1 | 1/2005 | Armangau et al. |
| 2005/0028022 | A1 | 2/2005 | Amano |
| 2005/0081099 | A1 | 4/2005 | Chang et al. |
| 2007/0005914 | A1 | 1/2007 | Thompson et al. |
| 2007/0005915 | A1 | 1/2007 | Thompson et al. |
| 2007/0006017 | A1 | 1/2007 | Thompson et al. |
| 2007/0006018 | A1 | 1/2007 | Thompson et al. |

OTHER PUBLICATIONS

How VERITAS Storage Foundation™ for Windows Integrates with and Enhances Windows Server 2003 Volume Shadow Copy Service. VERITAS Software Corporation. Nov. 20, 2003.*
Legato NetWorker Administrator's Guide Release 6.0. Legato Systems, Inc. Aug. 2000. pp. 276,312,502.*

(Continued)

*Primary Examiner*—Scott Baderman
*Assistant Examiner*—Paul F Contino
(74) *Attorney, Agent, or Firm*—Workman Nydegger

(57) ABSTRACT

Systems and methods for recovering data from a backup copy and for backing up data. When a recovery operation is initiated, recovery items are selected from backup groupings of the client. The recovery items can include backup groupings, writers, and writer components. After the recovery items are selected, backed up metadata for each selected writer is retrieved from the backed up data. The backed up metadata is then queried to identify the restore method of the writer. The data of the client is then recovered by implementing the restore method included in the backed up metadata of the writer. During a backup operation, some of the backup groupings, as well as the content of the backup groupings, can be individually selected for backup. In both backup and recovery, a visual indication may be provided to identify individual selectability.

28 Claims, 7 Drawing Sheets

OTHER PUBLICATIONS

Paragon Drive Backup Enterprise Server Edition, Best Practices for MS Exchange Server. [retrieved on Aug. 8, 2007]Retrieved from the Internet <URL: http://download.paragon-software.com/doc/Best_Practices_MS_Exchange_Server.pdf>.*

VERITAS Backup Exec 9.1 for Windows Servers. VERITAS Software Corporation. Jan. 21, 2004.*

Sankaran, Ananda; Guinn, Kevin; Nguyen, Dat. Volume Shadow Copy Service Helps Build an Integrated Backup System. Power Solutions. Mar. 2004.*

Symantec Backup Exec Quick Recovery and Off-Host Backup Solutions. Symantec. Jan. 2007.*

Quick recovery for Microsoft Exchange 2003 using VERITAS Storage Foundation for Microsoft Windows and HP storage—white paper. Hewlett-Packard Development Company, L.P. Sep. 2004.*

Why Windows Storage Server 2003 for your NAS Solution? Microsoft Corporation. 2002.*

Backup and Restore Technologies. Jun. 18, 2003. [retrieved on Aug. 8, 2007]. Retrieved from the Internet <URL: http://searchwincomputing.techtarget.com/searchWinSystems/downloads/Naik_ch05.pdf>. pp. 137-173.*

Sun StorEdge Enterprise Backup Software 7.1 Administrator's Guide. LEGATO Systems, Inc. Sep. 2003. pp. 1,2.*

VERITAS Storage Foundation 4.0 for Windows Solutions Guide Windows Server 2003. VERITAS Software Corporation. 2003. pp. 1,2.*

VERITAS Storage Foundation 4.1 for Windows Solutions Guide Windows 2000, Windows Server 2003. VERITAS Software Corporation. 2004. pp. 1,2.*

VERITAS Storage Foundation 4.1 for Windows Administrator's Guide Windows 2000, Windows Server 2003. VERITAS Software Corporation. 2004. pp. 1,2.*

VERITAS Storage Foundation 4.1 for Windows Solutions Guide for Microsoft Exchange Server Windows 2000, Windows Server 2003. VERITAS Software Corporation. May 2004. pp. 1,2.*

How Volume Shadow Copy Service Works. Microsoft Corporation. [retrieved on Aug. 8, 2007] Retrieved from the Internet <URL: http://technet2.microsoft.com/windowsserver/en/library/2b0d2457-b7d8-42c3-b6c9-59c145b7765f1033.mspx?mfr=true>. Mar. 28, 2003.*

Use of Components by the Requester (Windows). Microsoft Corporation. [retrieved on Aug. 8, 2007] Retrieved from the Internet <URL: http://msdn2.microsoft.com/en-us/library/aa384628.aspx>. Jul. 2, 2007.*

IVssBackupComponents::AddComponent. Microsoft Corporation. [retrieved on Aug. 8, 2007] Retrieved from the Internet <URL: http://msdn2.microsoft.com/en-us/library/aa382646.aspx>. Jul. 2, 2007.*

Overview of Actual File Restoration. Microsoft Corporation. [retrieved on Aug. 8, 2007] Retrieved from the Internet <URL: http://msdn2.microsoft.com/en-us/library/aa384575.aspx>. Jul. 2, 2007.*

Overview of Backup Initialization. Microsoft Corporation. [retrieved on Aug. 8, 2007] Retrieved from the Internet <URL: http://msdn2.microsoft.com/en-us/library/aa384577.aspx>. Jul. 2, 2007.*

Overview of Processing a Restore under VSS. Microsoft Corporation. [retrieved on Aug. 8, 2007] Retrieved from the Internet <URL: http://msdn2.microsoft.com/en-us/library/aa384590.aspx>. Jul. 2, 2007.*

Writer Metadata Document Life Cycle. Microsoft Corporation. [retrieved on Aug. 8, 2007] Retrieved from the Internet <URL: http://msdn2.microsoft.com/en-us/library/aa384998.aspx>. Jul. 2, 2007.*

Overview of Restore Initialization. Microsoft Corporation. [retrieved on Aug. 8, 2007] Retrieved from the Internet <URL: http://msdn2.microsoft.com/en-us/library/aa384592.aspx>. Jul. 2, 2007.*

Office Action mailed Jun. 1, 2007 for U.S. Appl. No. 11/170,015.

Office Action mailed Jun. 1, 2007 for U.S. Appl. No. 11/169,853.

Office Action mailed Sep. 7, 2007 for U.S. Appl. No. 11/169,418.

Office Action mailed Sep. 7, 2007 for U.S. Appl. No. 11/169,419.

Office Action mailed Sep. 27, 2007 for U.S. Appl. No. 10/978,025.

Microsoft Windows Server 2003. Introduction to Shadow Copies of Shared Folders. Microsoft Corporation. Mar. 2003. 15 Pages.

Microsoft Windows Server 2003. Windows Server 2003 Active Directory Fast Recovery with Volume Shadow Copy Service and Virtual Disk Service. Microsoft Corporation. Aug. 2003. 16 Pages.

Microsoft Windows Storage Server 2003. NSI Software. NSI solutions with Microsoft VSS. Microsoft Corporation. Mar. 2004. 8 pages.

* cited by examiner

SYSTEMS AND METHODS FOR RECOVERING AND BACKING UP DATA

CROSS-REFERENCE TO RELATED APPLICATIONS

Not applicable.

BACKGROUND OF THE INVENTION

1. The Field of the Invention

The present invention relates to systems and methods for backing up data. More particularly, embodiments of the invention relate to systems and methods for backing up and recovering data that includes active applications and operating systems.

2. Background and Relevant Art

Computer networks have become an integral part of modern life. The Internet is ubiquitous in both homes and corporate networks. Many corporate entities also use local area networks (LANs) within their own organizations in addition to providing consumers with access to some data over the Internet.

Because of the dependence on computer networks and on computers themselves, a premium is placed on the availability and reliability of data. For many corporate enterprises, essentially all corporate data is stored on a computer network and access to the data is expected at any time. The demand for uninterrupted access to data corresponds to a need for software and hardware that can meet the demand to provide data and services. At the same time, the demand for access to data and the quantity of data has made it increasingly difficult to protect the data from events such as system failures, viruses, power outages, etc.

In view of these potential problems, it is imperative that the data be protected. This is typically accomplished through the use of software that backs up the data and that recovers the data from the backup copy. As the amount of data continues to increase, backing up and recovering the data becomes more complex. Gigabytes of data cannot currently be quickly transferred from one volume to a backup volume and taking a volume of data offline for backup purposes is an unattractive option.

Backing up large amounts of data, however, is not the only problem related to back up software. It is often necessary to also back up other types of data such as applications and services. However, applications and services often have open files when a backup is initiated. Open files generally cannot be effectively backed up using conventional systems, and are often skipped during backup operations. As a result, additional applications are often needed to help manage backups of open files and to administrate backup logs for files that were skipped during backup.

Operating systems present another challenge to software and systems that back up data. The complexity of operating systems often requires operating systems to be backed up in a logical unit to preserve the state of the system or client. A partial backup of an operating system may result in inconsistencies or system failure if the operating system is restored from a partial or incomplete backup. In other words, backing up the file system itself does not effectively back up the state of the system and may result in errors when recovered. Operating systems are often used with databases or other volumes of data that need to be backed up while preserving the state of the system. In addition, operating systems as well as applications and services are often distributed across computer systems, a fact that complicates an effective backup and recovery of the data.

The desire to provide uninterrupted service combined with increased storage requirements creates the need for systems and methods for backing up data quickly and with minimal interruption to applications and services.

BRIEF DESCRIPTION OF THE DRAWINGS

In order to describe the manner in which the advantages and features of the invention can be obtained, a description of the invention will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
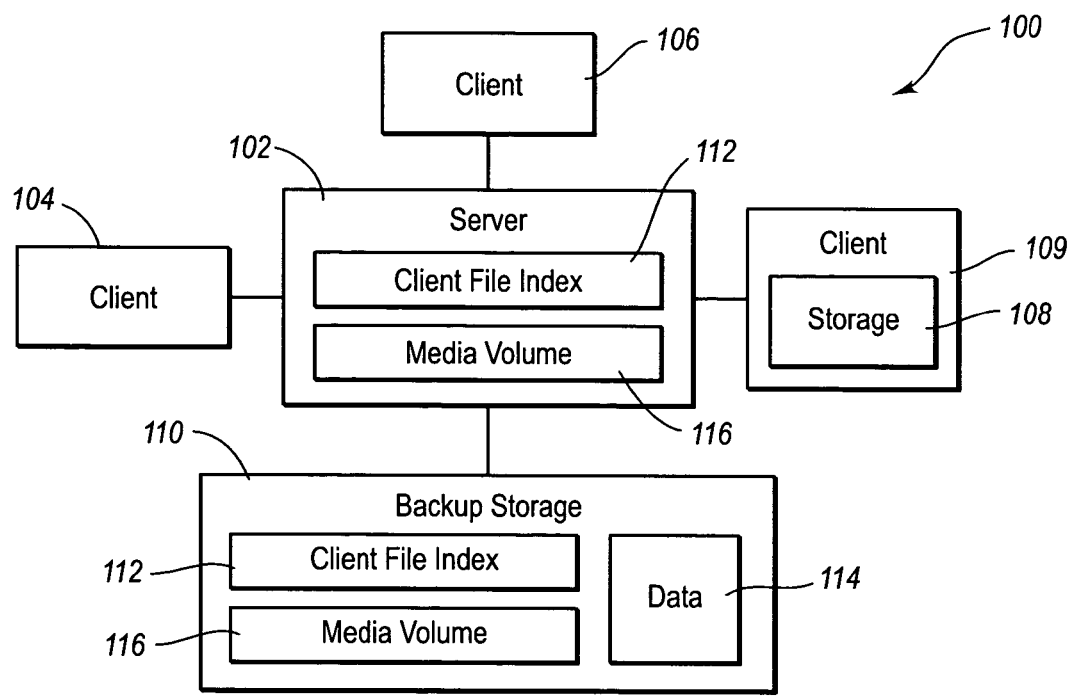
FIG. 1 illustrates an exemplary environment for implementing embodiments of the present invention.

Embodiments of the present invention relate to systems and methods for selectively backing up and/or recovering data. As used herein, data may include, but is not limited to, user data, system data, applications, services, and/or operating systems. Backing up or recovering the operating system may include backing up or recovering the operating system drive, and related applications and services. Embodiments of the invention enable a point in time copy of a complete system volume or of designated portion of a system volume to be backed up and/or recovered.

Advantageously, the point in time copy includes useful backups of open files and also provides, when backing up an operating system, a backup of the state of the system. This enables the operating system to be recovered as a logical unit without corrupting the state of the system. Embodiments of the invention further enable components of a client or system to be selectively backed up and/or restored.

When a backup is performed in accordance with embodiments of the present invention, the system that is processing or controlling the storage of the data that is to be backed up (such as user data, system data, an application, a service, or an operating system) is directed to temporarily freeze or suspend operation. During the suspended operation, a virtual volume of the data is created. After the virtual volume is created, the application or service is directed to resume operation while the backup is made from the virtual volume.

One of the advantages afforded by embodiments of the invention is that the suspended operation allows open files to be captured and reflected in the virtual volume. Open files are therefore not skipped in the backup. Also, the service or application being backed up is notified before the creation of the virtual volume and is given time to pause and prepare for back up. For example, the data being backed up may ensure that transactions are suspended and that the data to be backed up is in a consistent state.

One of the constructs used to ensure that a backup of data, such as an operating system, is maintained in a logical unit, is a backup grouping as described in greater detail in reference to FIG. 3. A backup grouping may refer to a volume or drive that is backed up by walking the directories of the volume. A backup grouping for a volume typically identifies the volume to be backed up. Other backup groupings may include information that identify the items that need to be backed up as well as identifying a restore method. Because the items identified in a backup grouping may be distributed, embodiments of the invention can walk through the items identified in the backup groupings to ensure that the corresponding data is properly backed up. In contrast, simply walking the directories and sub-directories of a file system does not typically backup an operating system as a logical unit. In other words, a conventional backup of a file system does not preserve the state of the system and may result in inconsistencies or failures when recovered.

1. Overview of Exemplary Systems for Backing up Data

FIG. 1 illustrates an exemplary system for backing up network data that can be adapted for use with the invention. Although the system of FIG. 1 can be used to back up data according to the invention, embodiments of the invention can also be practiced in other networks that have data to be backed up. FIG. 1 illustrates a server 102 that has a relationship with client(s) that are represented by the clients 104, 106, and 108. Each client 104, 106, and 108 may have data on a storage volume that is local and/or remote with respect to the respective client. The storage volume represents one or more volumes or drives of the client as well as applications and services. The client 108, for instance, has storage 109 that contains data (including applications, services, and/or volumes). Also, services represent a type of application and may therefore be referred to as applications herein.

Each client 104, 106, and 108 represents a system with data to be backed up. Each client can be relatively simple (e.g., a desktop computer) or relatively complex (e.g., a large database server or a cluster of servers). The client may further be a network or a storage area network (SAN). Each client 104, 106, and 108 may also operate under a different operating system or platform than the server 102. In the context of a backup operation, a client may operate under the control of the server 102.

A user may establish a schedule that defines the times at which the server 102 automatically performs a backup operation on the data of clients 102, 104, and/or 106. However, users on the clients can also initiate ad hoc backup operations and recover operations. In the example of FIG. 1, the server 102 has access to backup storage 110 where copies of the client's data is stored. The backup storage 110 can be integrated with the server 102 or may be distinct and separate from the server 102. The data 114 represents the data that has been backed up by the server 102 on the back up storage 110.

The server 102 typically controls and directs all server initiated backup operations or processes. The client controls ad hoc backup and recover operations. Data is backed up, in one embodiment, using backup groupings. As described previously, each backup grouping is a collection of data or items that are backed up during a backup session between the server 102 and a particular client or clients. A backup grouping can therefore include a group of files, an entire file system, application-generated data such as a database or operating system information, and the like. A backup grouping may also include applications or services or components of applications, services, and/or operating systems. As described below, a backup grouping may include one or more writers, each corresponding to at least one application or service. The data associated with writers in a backup grouping may further be located in different directories, different volumes, and the like.

In certain types of data or items, such as operating systems, it is strongly recommended that the critical components of the operating system be backed up and recovered as a consistent unit. In other words, an operating system may include files or databases that define the state of the client or system at any given time. Simply backing up contents of the file system may not, as previously described, capture the state of the client, as previously explained. When the server 102 performs a backup of a system, it usually ensures that the appropriate backup groupings associated with the operating system are backed up at the same time or together to ensure that the operating system is backed up as a consistent unit and that the state of the client or system is preserved in the backup of the data. A client may include other applications or services, in addition to the operating system specific applications and services, that also have components that should be backed up as a consistent unit.

The server 102 also stores and manages a client file index 112 and a media volume 116 both on the server itself and on the backup storage 110. The client-file index 112 is an index of the backed up data items. The media volume 116 is an index of the backup volumes. The client file index 112 and the media volume 116 are collectively referred to herein as the "online indexes". The online indexes are typically stored on the backup storage 110 after the backup operation is complete.

2. Backup Groupings Used with Application Writers

Figure 2:
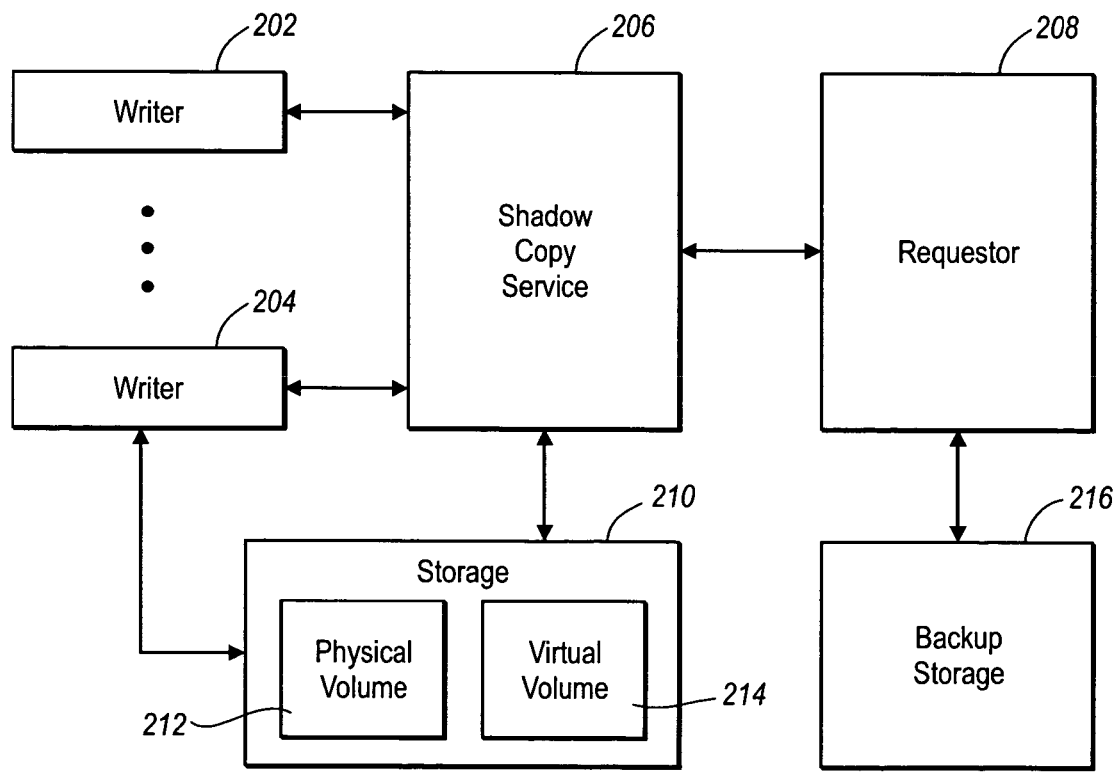
FIG. 2 illustrates an embodiment of a requestor that backs up data from a virtual volume using a copy service.

FIG. 2 illustrates an exemplary system for backing up and/or recovering data that operates according to embodiments of the invention. Each writer in FIG. 2, represented by the writers 202 and 204, is associated with at least one application or service and at least one backup grouping. During a backup process, the writers provide metadata that include the writer's name, items or data such as files and components to back up, what items or data are to be excluded from the backup, and/or the methods for handling components and applications during backup and restore. The writers 202, 204 also identify the type of application or service that is being backed up.

A writer may be associated, for example, with a mail server, a database, an operating system, or other application or data store. Although embodiments of the invention can be implemented in connection with substantially any operating systems and computers that provide writers or similar functionality, one example of an operating system that employs writers is Windows 2003 and later Windows versions available from Microsoft Corporation of Redmond, Wash.

In FIG. 2, the shadow copy service 206 is an operating system service that participates in the generation of a shadow copy (also referred to herein as a snapshot or as a virtual volume) of a particular set of data or volume. In one example, the virtual volumes are generated for a particular backup grouping. As other backup groupings are processed, additional virtual volume(s) are generated as required. In another example, multiple backup groupings are processed together and a single snapshot (which may include one or more virtual volumes) is generated to backup the backup groupings. Thus, a virtual volume may be created for each backup grouping, each writer, or a group of backup groupings or writers. The requestor 208 (which, in one embodiment, a backup process or a recover process operating on the client) typically initiates a backup operation by querying the service 206 to obtain the needed information for the backup operation from the writers 202, 204. The writers generate the metadata and the requestor 208 receives the metadata from the writers 202, 204. The metadata is typically saved by the requestor 208 before backing up the items or data identified in the metadata.

In this example, the physical volume 212 corresponds to the data identified in at least one of the backup groupings of the requestor 208. As the backup process continues, the writer may prepare the application for backup. This ensures that the physical volume is in a consistent state. The writer may prepare the application (or service) for backup, for example, by preventing new transactions from occurring, finishing existing transactions, and flushing any cache to disk or to the physical volume 212. After a consistent copy is stored in the physical volume 212, a virtual volume 214 is created.

The virtual volume 214 is typically a snapshot of the physical volume. After the virtual volume 214 is completed, the application is released and can continue operation. The requestor 208 makes or updates the backup in the back up storage 216 from the virtual volume 214.

More specifically, the requestor 208 asks the service 206 to identify the writers 202, 204 and to gather the metadata from the writers. In one embodiment, the service 206 only identifies active writers. The writers provide metadata to the requestor 208 that includes an XML description of the backup components and the restore method. The description of the backup components may include information relating to the individual selectability of the writer components. For example, the backup components may indicate that some of the writer components should be selected together for backup or recovery. In another example, some writer components may be individually selectable for recovery, but may not be individually selectable for backup. Through the service 206, the requestor 208 can identify which volumes support a shadow copy for the volumes required by the XML description in the metadata.

Through the service 206, the writers freeze the activity of the corresponding applications and the requestor 208 then instructs the service 206 to create shadow copies (virtual volumes). After the snapshot(s) are completed, the writers may resume activity. A backup copy of the items identified in the backup groupings is then made from the one or more virtual volumes. After the backup is complete, the virtual volume(s) may be deleted.

Figure 3A:
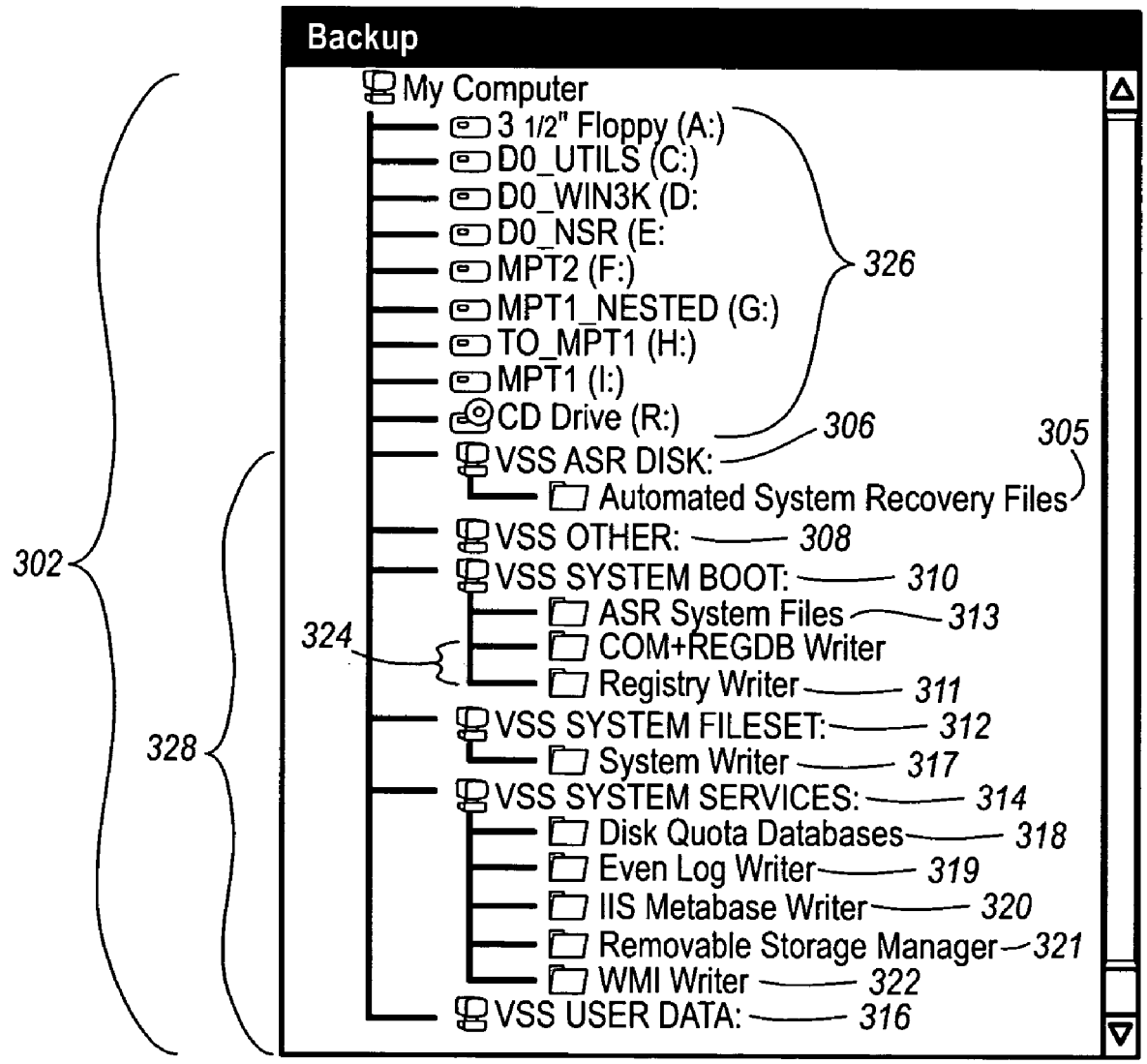
FIGS. 3A, 3B and 3C illustrate examples of backup groupings used for backup operations and/or recover operations.
Figure 3B:
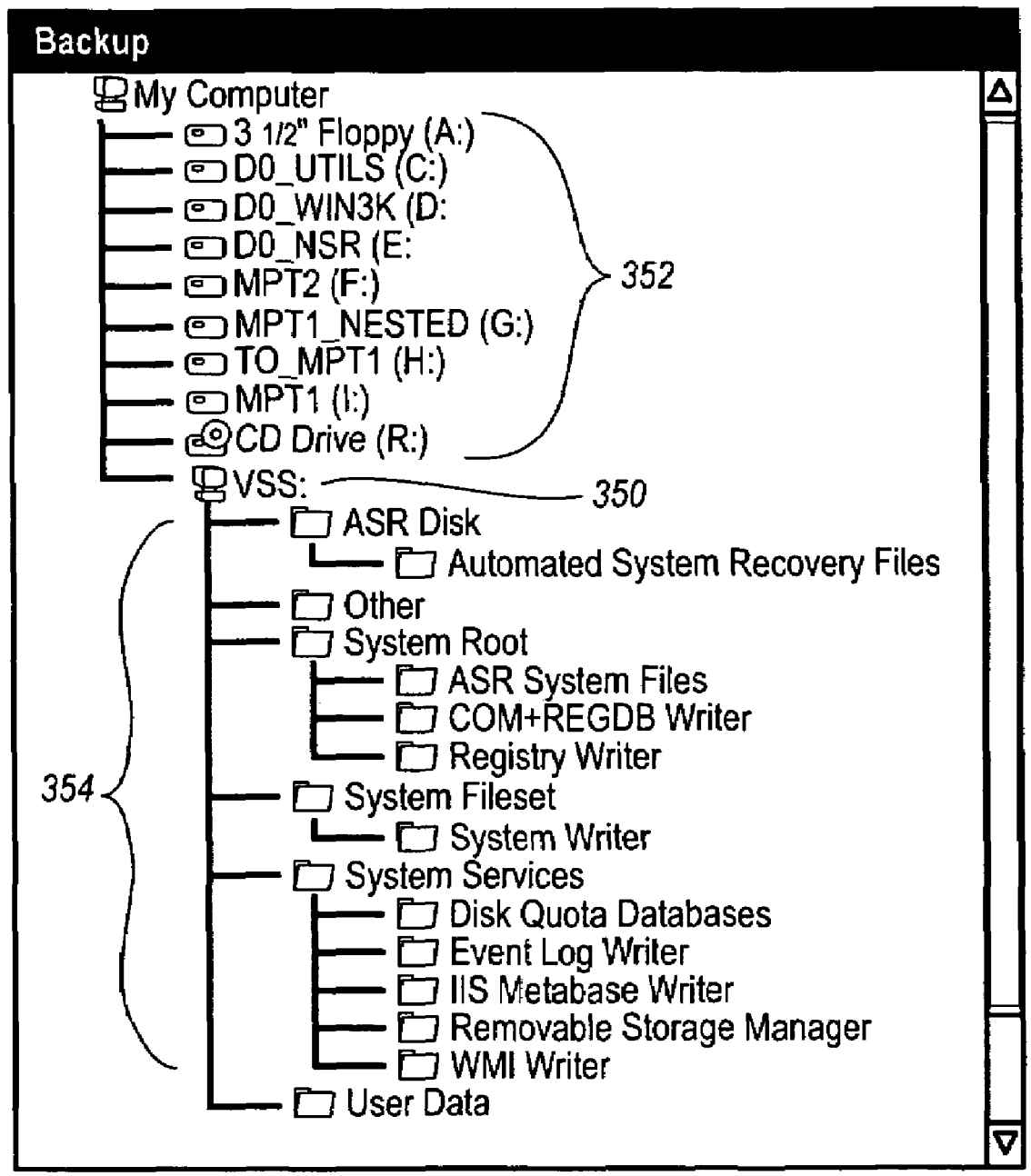

FIGS. 3A, and 3B further illustrate the concept of backup groupings. FIGS. 3A and 3B illustrate two examples for illustrating the backup groupings of a client. FIG. 3A illustrates the backup groupings 302 that include the backup groupings 326 and the backup groupings 328 in the same tree. In, the backup groupings 352 are arranged identically to the corresponding backup groupings 326 in FIG. 3A. The backup groupings 354 are arranged under a tree 350 while the backup groupings 328 are arranged under separate trees in FIG. 3A. The interface of FIG. 3B provides additional flexibility in viewing the backup groupings 354.

The backup groupings in FIGS. 3A and 3B are identical, but have distinct hierarchies. Also, the backup groupings 354 typically include applications or services that may be associated with a writer. This is one reason they are grouped under the tree 350. The backup groupings 352 are not associated with corresponding writers. The following discussion references the backup groupings in FIG. 3A, but one of skill in the art can appreciate that it applies to the backup groupings illustrated in FIG. 3B.

The backup groupings 302 represent exemplary views of the backup groupings associated with a particular client. In one example, when a full backup of the client is performed, the backup groupings 326 may be generated dynamically. The backup groupings 328 may be predetermined and may be related to the backup groupings needed to preserve a state of the client.

The content of the backup groupings 328 may be determined dynamically based in part on which writers are active on the client. Thus, defining the content of backup groupings can occur dynamically. In one embodiment, previously identified writers are associated with certain backup groupings. The placement of a writer within the backup groupings may be determined by a type of the writer.

In this example, writers 324 populate the backup grouping 310. The component 313, however, which is also included in the backup grouping 310 along with the writers 324, does not have a writer in this example. Other components in other backup groupings, such as the component 305 and the component 318, do not have a writer in one example. These components are backup up together with the corresponding components of the backup grouping to ensure that the backup grouping is backed up as a consistent unit. For example, all of the components in the backup grouping 310 are backed up together even though the component 313 is not associated with a writer.

With reference to the backup groupings 328, the backup groupings 306, 308, 310, 312, 314, and 316 are system backup groupings and may include operating system writers and writer components. Because many components of the system backup groupings 328 have interdependencies, it is preferable to back up all of the system's backup groupings at the same time. This ensures that the client can be restored in a consistent manner should restoration be required. In one example, at least the backup groupings 310, 312, and 314 should be backed up together in this example.

The backup groupings of a requestor may be predefined and be associated with writers that have a particular type. Alternatively, the backup groupings may be populated dynamically. When the writers of a client are enumerated or identified, writers of the same type become writers in a particular backup grouping. In other words, the components of a particular backup grouping may be populated dynamically and are based on which writers of the client are active. Thus, the writers associated with a particular backup grouping have the same type. For example in FIG. 3, the writers 324 each have the same type and are included in the backup grouping 310. If a writer for a particular application or service is not available (i.e., inactive or nonexistent), the appropriate files may be backed up via the file system when the corresponding volume(s) are selected for backup. For a given backup operation, some of the backup groupings may include active writers while others may not include any writers.

Figure 3C:
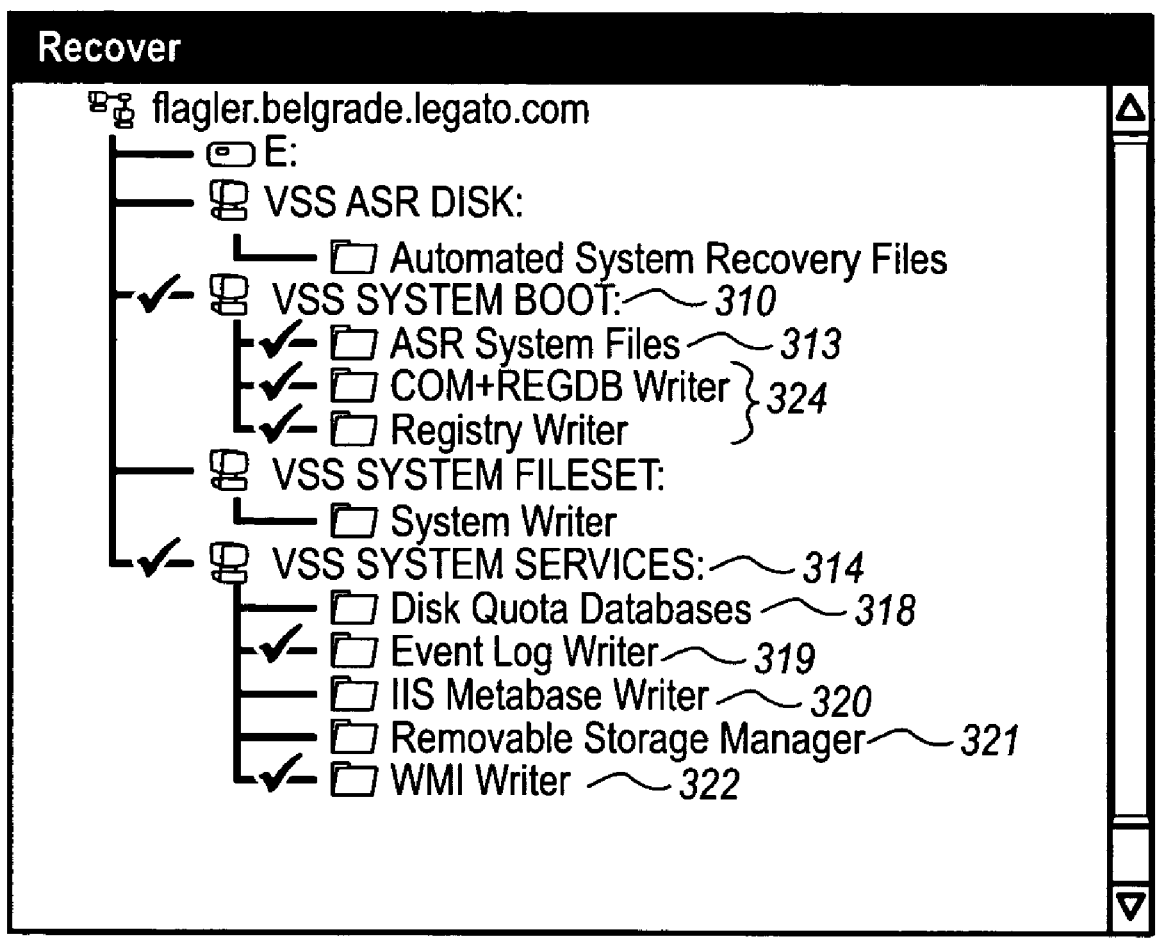

FIG. 3C further illustrates the ability to selectively recover a client. In FIG. 3C, the backup grouping 310 and 314 have been selected for recovery. In the backup grouping 310, the writers 324 have been selected as well as the component 313. As previously stated, the component 313 does not have a writer, but is backed up together with the writers 324. Components of a backup grouping that do not have a writer may be, for example, an application, a set of files that should be backed up all together, and the like.

In this example, all of the contents (writers 324 and component 313) of the backup grouping 310 should be selected. A user may not be permitted to deselect one of the writers or the application. The backup grouping 314, however, illustrates an example of a backup grouping where the writers are individually selectable for recovery. The writer 319 and the writer 322 have been selected for recovery. Thus, the other writers/applications in the backup grouping 314 are not selected for recovery.

Figure 4:
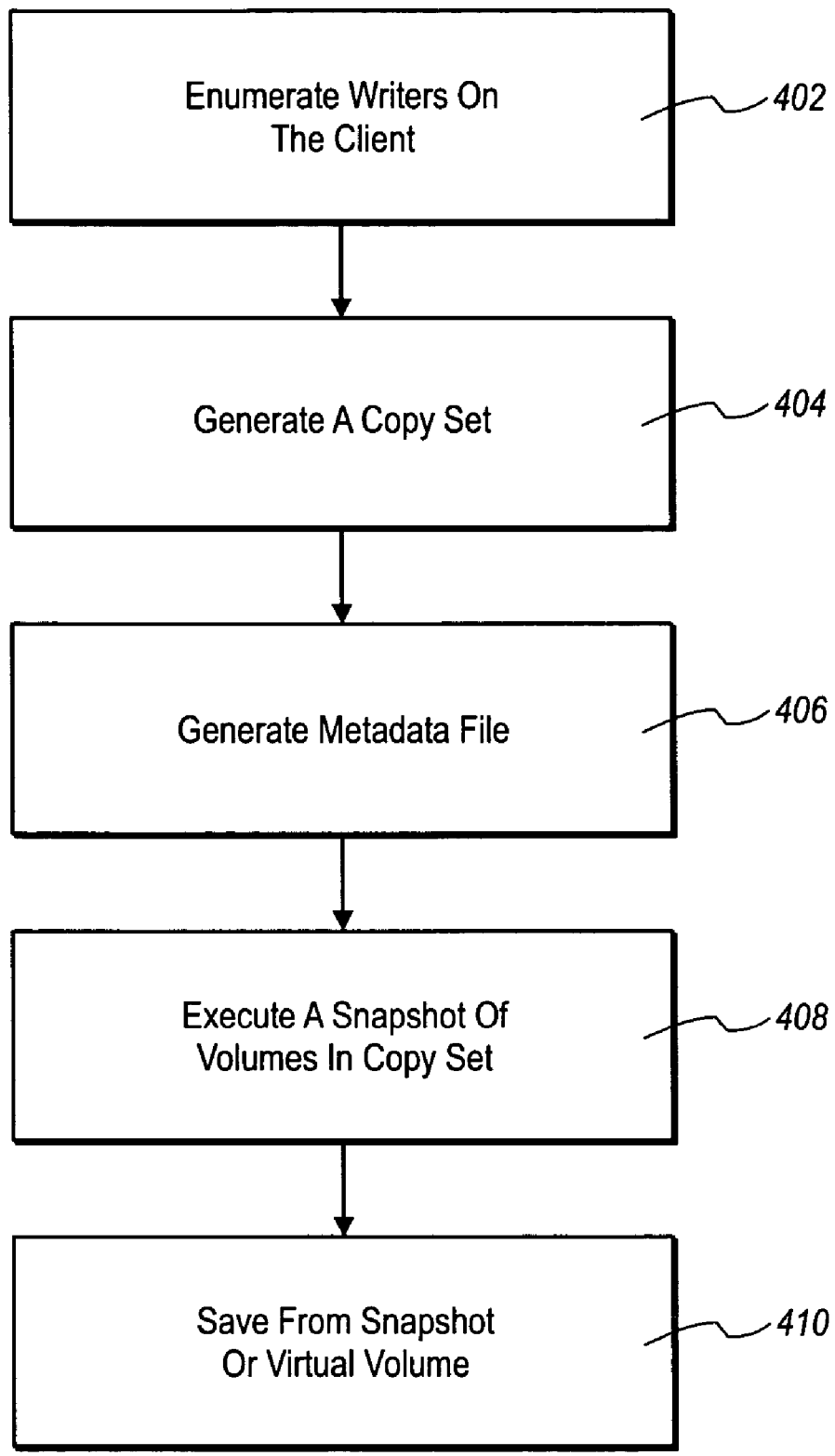
FIG. 4 is an exemplary flow chart for backing up data.

FIG. 4 illustrates an exemplary method for backing up a client. The snapshot (virtual volumes) for a backup operation may be used in varying levels. The snapshot may be used to perform a full backup of an entire volume or of a backup grouping or a set of backup groupings. The type of backup may also vary. For example, an incremental backup may be performed for certain backup groupings. When a backup grouping containing writers is being backed up, however, a full backup of all of the writers in the backup grouping is typically performed to preserve a state of the client or to preserve the state of the application or service being backed up. In some instances, one of the writers of the backup grouping may not be backed up. This can occur, for example, when the data associated with that writer has not changed. Performance of the backup can be improved, particularly if the application identified by the writer is large. In other words, refraining from backing up a large application that has not changed can improve backup performance. If the data of the application has changed, however, a full backup of the application is typically performed.

In this example, a requestor typically begins by interfacing with the copy service to enumerate the writers 402 that are currently active on the client. The writers that are active on a client can be discovered dynamically. The content of the backup groupings can be populated dynamically in this case based on the discovered writers.

After the writers have been enumerated and grouped into the respective backup groupings, the requestor generates a copy set 404. The copy set is a set of volumes that need to be included as part of the snapshot of the client. After the copy set is generated, the requester is ready for the snapshot to be created. In one embodiment, a snapshot is created for each backup grouping for a particular client. In another embodiment, a single snapshot is created for all backup groupings being backed up for a particular client. The set of volumes that should be included in the snapshot are typically resident at the client. Also, a copy set can be generated for each writer or each backup grouping independently of other writers or backup groupings. A copy set for a backup grouping is generated by querying each writer in the backup grouping for information describing how the associated data should be backed up as well as information identifying which data is to be backed up. Applications or services that do not have a writer are backed up, for example, by walking directories and subdirectories when the corresponding volumes are selected for backup.

Next, a metadata file is generated 406 from the information obtained from the copy set. The metadata file, as previously described, is a map that identifies the items or data to be backed up as well as, in some instances, items or data that is to be excluded from the backup. The metadata files often include instructions for an appropriate restore operation.

After the metadata files are generated, a snapshot of the relevant volumes is executed 408. A snapshot is taken for each backup grouping. Alternatively, the backup groupings associated with the backup operation are processed at the same time to identify the volumes to be included in a single snapshot. Before executing the snapshot, however, the shadow copy service notifies the writers that the snapshot is going to occur, and the writers are then instructed to pause or freeze the corresponding application or service such that the data of the client can reach a consistent state by, for example, pausing new transactions, finishing current transactions, flushing the cache to disk, etc. After a consistent state is reached, the snapshot may be executed.

After the snapshot is created, the client's data is backed up from the snapshot, which is the virtual volume 410 in this embodiment. The backup storage is then updated according to changes identified in the snapshot or a complete backup is performed from the virtual volume 410.

To access a particular version of the client's data, the backup storage may be configured to store multiple representations of the client's data. In other words, point in time representations of the client's data can be reconstructed. Also, the writer is enabled to release the application such that the application may continue operation even while it is being backed up from the virtual volume. The temporary suspension of the corresponding application or service is minimal compared to taking the application offline. By temporarily freezing the application while the snapshot is executed, all files or items that are identified in the backup grouping can be properly copied. The snapshot can therefore include files that are open. Thus, all items or data in the backup grouping, including open files, are properly backed up.

3. Error Handling During Backup Operations

During a backup operation, it is possible for errors to occur. In some instances, the failure of a particular writer may cause the backup of an entire backup grouping to fail or become inconsistent. FIG. 3 may be used to illustrate that a particular writer can be disabled, thereby overcoming errors for that writer and enabling other writers in the backup grouping to be successfully backed up. In one example, a writer is manually disabled by a user during an ad hoc backup operation. In another example, the backup server can be configured to automatically disable a writer for a particular client and notify a user that the writer has been disabled.

If the writer 319 fails, for example, it can be selectively disabled from the backup process. In other words, the shadow copy service 206 may enumerate the writer 319, but the writer 319 is not typically displayed to a user. The XML data associated with the writer 319, if generated, is not processed and a backup of the data identified by the writer 319 is not backed up. The data associated with the other writers of the backup grouping 314 are backed up. The writer 319 is disabled such that a failure of the entire backup of the backup grouping 314 does not occur.

The requestor sets internal directives such that all items specified by the active writers are not also backed up via the file system. Applications that do not have a writer can be backed up, in one embodiment, by walking the file system and processing each directory and sub-directory in turn.

Figure 5:
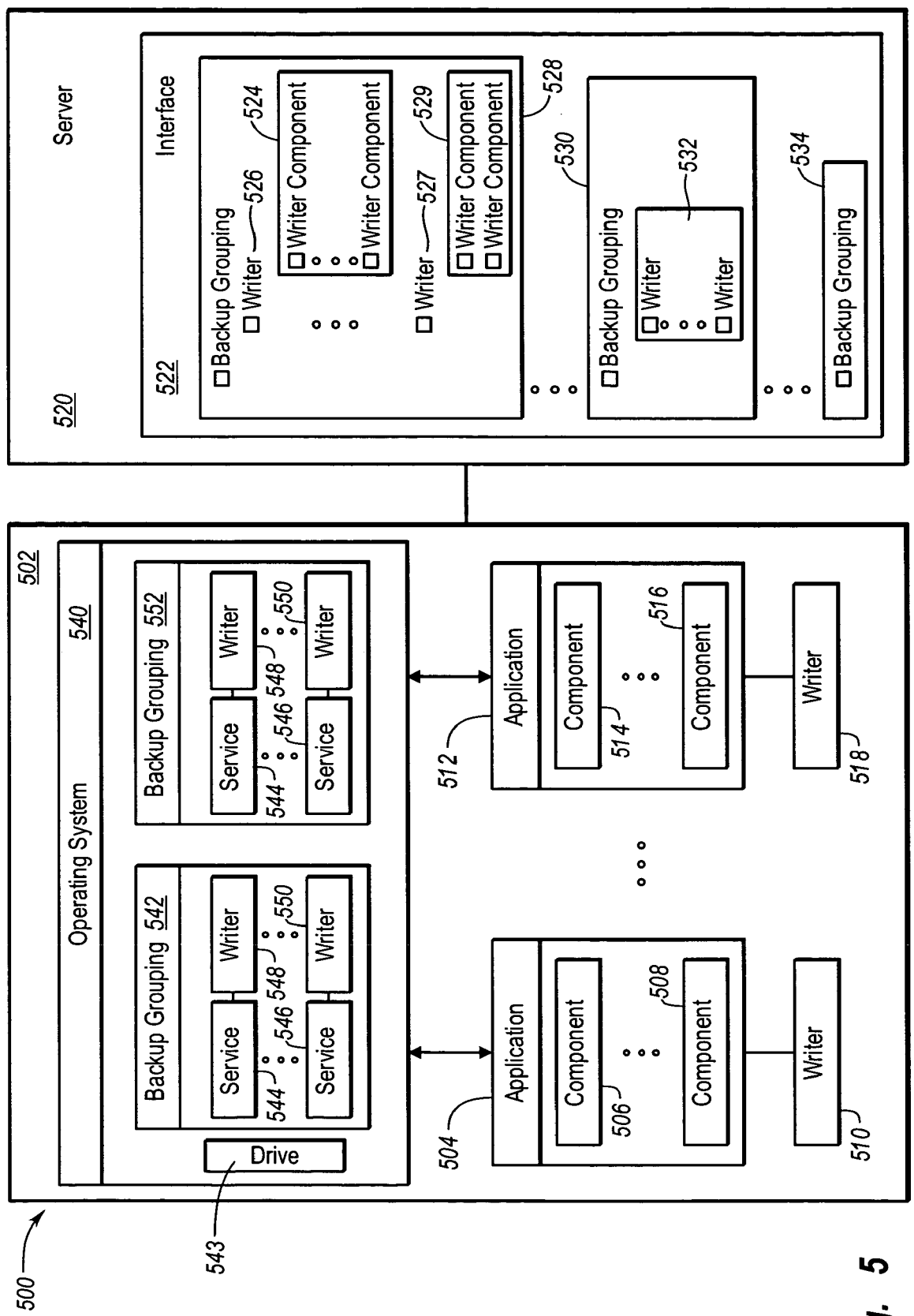
FIG. 5 illustrates an example of a backup system that can selectively back up and recover components of data including applications, services, and volumes.

4. Backup Groupings with Selectable Components for Backup and Restore Operations FIG. 5 is a block diagram illustrating the selectability of writers and/or writer components for both backup operations and restore operations. In one example, the selectability of writers and writer components is not random. The writer, for example, may determine which components are independently selectable and which components cannot be selected independently. Also, the writer may require that certain components be selected together. For example, the writers in the backup grouping 310 (see FIGS. 3A and 3C) are not individually selectable while the writers in the backup grouping 314 are individually selectable for both backup and recover. The interfaces shown in FIGS. 3A, 3B, and 3C may optionally include icons that visually indicate to a user whether a writer or a writer component is individually selectable for backup or recovery.

Selectable backup groupings enable the server to adapt to changes in the requirements for backing up operating systems as well as other applications and services. In a similar manner, writers and writer components of a backup grouping or of an application can be selected for backup or recovery. FIG. 5 also illustrates that the backup operation or recover operation performed by the server 520 is customizable and can backup/restore other types of databases, services, applications, data, etc., that are not part of the system state.

In this example, the client 502 includes an operating system 540, an application 504 (representative of multiple non operating system applications), and a service 512 (representative of multiple non operating system services). The operating system 540 is illustrated in terms of backup groupings and an operating system drive. In this example, the backup grouping 542 and the backup grouping 552 should be backed up together and recovered together to preserve the state of the client's system. The operating system drive 543 is typically included as well with the backup groupings 542 and 552.

The backup grouping 542 includes one or more services represented by the services 544 and 546. The backup grouping 552 includes one or more applications represented by the applications 554 and 556. One of skill in the art can appreciate that a backup grouping can include both services, applications, and/or other data. Some services and applications in the backup groupings 542 and 552 have an associated writer. As previously discussed however, some applications or services may not have a corresponding writer. The service 544 is associated with the writer 548, the service 546 with the writer 550, the application 554 with the writer 558, and the application 556 with the writer 560.

When the writers are enumerated, the backup server 520 becomes aware of the writers 548, 550, 558, 560, 510, and 518, which are all active writers in this example. As illustrated, the writers 548 and 550 have a particular type that places them in the backup grouping 542. For example, the backup grouping 528 illustrated in the interface 522 may correspond with the backup grouping 542 illustrated in the client 502.

FIG. 5 also illustrates the application 504 which has components 506 and 508, and the service 512 which has the components 514 and 516. The application 504 is associated with the writer 510, and the service 512 is associated with the writer 518. Each writer can suspend and enable the operation of the corresponding application, service, or components thereof during backup and, if necessary, during recovery.

As previously described, the server 520 enumerates the writers 510, 518, 548, 550, 558, and 560 when a backup operation is initiated. These writers are active in this example and discovered by the server 520 dynamically by querying the shadow copy service. In one embodiment, some of the content of the backup groupings may already be known to the server 520 and do not need to be discovered.

Each writer is aware of the items or data that should be backed up for the associated application or service. For example, the writer 510 understands that the items to be backed up for the application 504 may include the component 506 and the component 508. The writer 510 may also identify items or components that can be individually selected for backup or recovery. The writer 510 may also identify items or components that need to be selected together for backup or recovery. In addition, some of the writer components that are backed up together may not need to be recovered together. This information is typically provided to the backup and recover processes in a particular format, such as XML.

The server 520 can generate a user interface represented by the interface 522 that enables a user or administrator to select fewer than all of the writers and/or their components for backup and recover operations. For illustration purposes, the interface 522 displays backup groupings 528, 530, and 534. The backup grouping 528 includes the writer 526 and the writer 527. The writer 526 is associated with the writer components 524 and the writer 527 is associated with the writer components 529.

A checkbox is displayed by each backup grouping, writer, and writer component in the interface 522 and a user can check the checkboxes to select which backup groupings, writers, and/or writer components should be backed up and/or recovered. In one example, a visual indication such as an icon may be displayed if selectable backup/recovery is supported by the writer for a particular writer component or group of writer components. In other words, a user may not be permitted to select individual components for backup and/or recover when not supported by the writer. This gives the backup process and the recover process the ability to control the data that is backed up or recovered.

For example, through the interface 522, a user may select to backup only the backup grouping 542 of the operating system 540. As previously stated, it is often advisable to back up the operating system 540 as a logically consistent unit. This may require the selection of multiple backup groupings. Each backup grouping of the operating system 540 may be associated with more than one writer or with a different writer.

Certain backup groupings of the operating system 540 should be backed up all together in order to preserve the state of the client 502. At recover time, a warning may be issued to the user when the appropriate backup groupings are not all selected together or when a recommended backup grouping, writer, or writer component for a recovery is not selected. For example, if the backup grouping 528 and the backup grouping 530 (which correspond to the backup groupings 542 and 552) should be recovered together to restore the state of the client 502 and only the backup grouping 528 is selected, the recover process may advise the user that the backup grouping 530 should also be selected. However, the recover process may not prevent the user proposed recover operation from proceeding.

Thus, the backup and recover processes enable fewer than all of the backup groupings containing writers for a particular system to be backed up or recovered. In some instances, the state of the client can be preserved even when some of the components of the operating system are not selected. The operating system may be associated with some backup groupings that are not necessarily required to preserve the state of the system or client. This can result in improved performance by selectively backing up and/or recovering selected backup groupings or portions of backup groupings of the client 502 without risking that the state of the client is unprotected or inconsistent.

The interface 522 may also be used to initiate a recover operation. Because the operating system is typically backed up as a logical unit, the operating system is usually recovered as a unit. As previously indicated, each writer's metadata is saved as part of the backup operation. The metadata can be used to determine whether the restore is related to a shadow copy backup operation. If the backup copy was generated from a shadow copy (virtual volume), the shadow copy service illustrated in FIG. 2 may be involved in the recover or restore operation.

Figure 6:
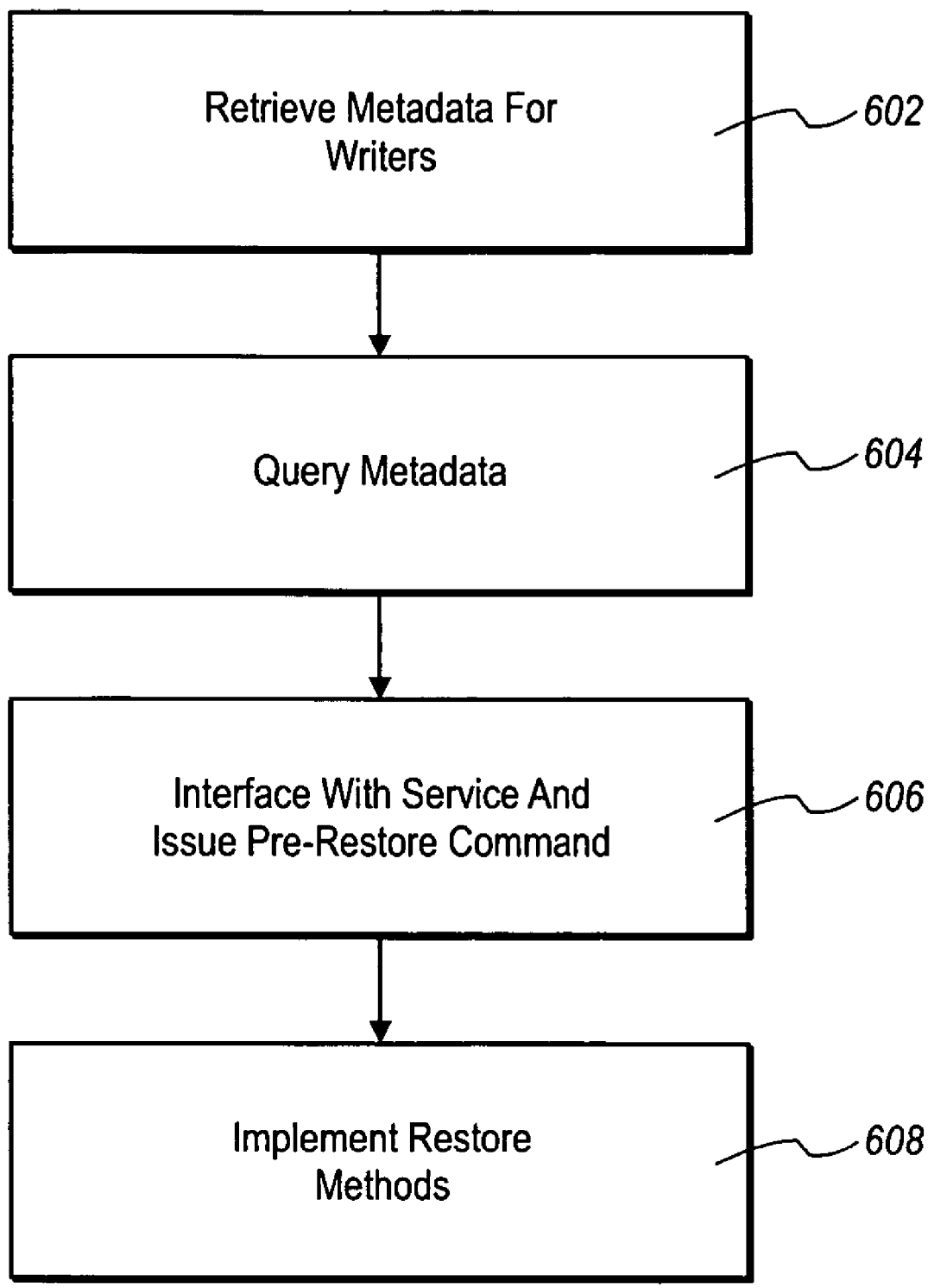
FIG. 6 is a flow chart illustrating an exemplary method for recovering data from a backup copy.

FIG. 6 illustrates an exemplary method of a recover operation. The recover process (requester) typically begins by retrieving the backed up metadata for each writer 602 that was included with the backup. Because metadata used in a recover operation is from the backed up data at the selected backup time, it is possible that it may include writers that are no longer present on the client or that are currently inactive on the client. However, these writers are typically restored because the client is being restored to the state of the selected backup time. This may also occur in the context of a disaster recover situation.

The metadata is typically passed to the shadow copy service (see FIG. 2) and the service can then be queried during the recover operation. If mountpoints exist within a writer's list of saved files, a mountpoint file containing the mountpoint and the volume it points to is recovered before any writer data is recovered. The mountpoints may be needed to properly restore or recover writer data.

The metadata is then queried 604 as the recover operation continues. The metadata is queried, for example, to determine the restore method of a particular writer, the usage type, whether or not a reboot is required to restore the writer, and any potential alternate location mappings.

Next, the recover process interfaces with the shadow copy service and issues a pre-restore command 606. The pre-restore command informs writers that have writer components selected for recovery that a restore operation is imminent. The writers and the associated applications thus have an opportunity to prepare for the recover operation. The recover process then implements the restore method 608 identified in the metadata of each writer.

After the files have been copied during the recover operation, a post restore notification is issued to the affected writers. The writers can then perform post restore operations as applicable. At this point, the server may advise a reboot of the client system.

The interface 522 is one example of a method for selectively identifying backup groupings, writers, and/or writer components for recovery The selected backup grouping, writers, and/or writing components are examples of recovery items. The recovery operation then proceeds based on the writers that are included in the recovery items. The restore methods, for example, are implemented for each writer according to the metadata associated with each writer. If a writer component has been deselected, then the corresponding portion of the metadata may be disabled or ignored during the recovery operation. If operating specific backup groupings are selected for recovery, the recovery operation may prompt the user that all appropriate backup groupings, writers, and/or writer components are not selected to comply with the recommendation of restoring the operating system as a logical unit. The recovery operation may proceed, however, without selecting the recommended backup groupings.

When a component of a writer is not selected for restore or when a writer of a backup grouping is not selected for restore, the recover process can ignore or disable the portion of the metadata that corresponds to the unselected component or writer.

5. Exemplary Computing Systems

The present invention extends to both methods and systems for backing up data. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a system including a server that backs up data of one or more clients, a method for recovering data of a client from a backup copy of the data, the method comprising:
   selecting recovery items from one or more backup groupings for a recover operation, the recovery items including one or more of a writer component, a writer, and a backup grouping, wherein selecting recovery items further comprises:
      enumerating active writers active on the client; and
      enumerating unavailable writers using the backed up metadata file of the client;
   retrieving backed up metadata for each writer included in the selected recovery items;
   querying the backed up metadata of each writer to identify a restore method for each writer; and
   implementing the restore method of each writer to recover the data of the client.

2. A method as defined in claim 1, wherein selecting recovery items from one or more backup groupings for a recover operation further comprises identifying writers that were active at a selected backup time.

3. A method as defined in claim 1, wherein selecting recovery items from one or more backup groupings for a recover operation further comprises;
   displaying the one or more backup groupings to a user; and
   receiving input from the user to select or deselect the recovery items from the displayed one or more backup groupings.

4. A method as defined in claim 3, further comprising advising the user that a state of the client may not be properly recovered unless specific backup groupings are selected.

5. A method as defined in claim 1, wherein selecting recovery items from one or more backup groupings for a recover operation further comprises providing a visual indication that identifies an individual selectability of the recovery items.

6. A method as defined in claim 5, wherein the visual indication includes icons.

7. A method for restoring data of a client, the method comprising:
   displaying a list of backup groupings to a user, wherein each backup grouping includes one or more writers each having a particular type, each writer associated with an application or service of the client;
   receiving input from the user to select recovery items for restoration, the recovery items including one or more of a backup grouping, a writer, and a writer component;
   enumerating active writer of a client through a service provided by an operating system of the client;
   enumerating unavailable writers using the backed up metadata file of the client; and
   restoring the recovery items using a restore method associated with each writer included in the recovery items.

8. A method as defined in claim 7, further comprising receiving metadata for each writer included in the recovery items.

9. A method as defined in claim 7, further comprising identifying the restore method for each writer in the recovery items.

10. A method as defined in claim 7, further comprising:
    causing each writer identified in the recovery items to be notified that a restore operation is about to occur to enable each writer to prepare for the restore operation;
    performing the restore methods identified in the recovery items.

11. A method as defined in claim 7, wherein receiving input from the user to select items for restoration further comprises selecting one or more writer components for a particular writer.

12. A method as defined in claim 7, wherein receiving input from the user to select items for restoration further comprises advising that, when restoring an operating system, each backup grouping required to restore a state of the client is to be selected.

13. A method as defined in claim 7, wherein receiving input from the user to select items for restoration further comprises selecting fewer than all of the writer components associated with an operating system.

14. A method as defined in claim 7, wherein receiving input from the user to select items for restoration further comprises walking directories and sub-directories to restore data for selected backup groupings that do not have an associated writer.

15. A method as defined in claim 7, wherein displaying a list of backup groupings to a user further comprises providing a visual indication of an individual selectability of the one or more writers.

16. In a system that includes one or more clients in communication with a server that stores a backup of data from the one or more clients, a method for backing up the data, the method comprising:
    dynamically enumerating writers that are active on a client;
    presenting a user interface that displays one or more backup groupings to a user and that enables the user to select specific backup groupings, writers and writer components, wherein at least one of the backup groupings includes one or more of the enumerated writers;
    receiving input from the user to select one or more of a backup grouping, a writer, and a writer component from the one or more backup groupings displayed to the user, wherein the user interface advises the user that a state of the client may not be preserved unless a particular unselected backup grouping is selected and wherein at least some of the writers and the writer components are not individually selectable for backup; and
    backing up data of the client associated with the selected backup grouping, writer, or writer component.

17. A method as defined in claim 16, further comprising receiving metadata from the enumerated writers, the metadata defining items to back up, defining restore methods for the enumerated writers, and defining writer component selectability for the enumerated writers.

18. A method as defined in claim 16, wherein backing up data of the client associated with the selected backup grouping further comprises:
- causing each application associated with selected backup groupings to prepare for backup;
- requesting a snapshot of at least one volume associated with the selected backup groupings; and
- generating a backup copy from the snapshot.

19. A method as defined in claim 18, further comprising causing applications associated with writers in the selected backup groupings to resume operation.

20. A method as defined in claim 16, wherein receiving input from the user to select one or more of a backup grouping further comprises at least one of:
- receiving input from the user to select one or more writer components;
- receiving input from the user to select one or more writers;
- receiving input from the user to select one or more backup groupings;
- receiving input from the user to unselect one or more backup groupings, one or more writers, or one or more writer components.

21. A method as defined in claim 16, further comprising selecting each backup grouping required to preserve a state of the client's operating system.

22. A method as defined in claim 20, wherein displaying one or more backup groupings to a user further comprises displaying icons representing an individual selectability of the one or more writers and the one or more writer components of the one or more backup groupings.

23. A computer readable medium having computer executable instructions for performing the method of claim 16, the computer readable medium including at least one of RAM, ROM, EEPROM, CD-ROM, optical disk storage, or magnetic disk storage.

24. In a system that includes one or more clients in communication with a server that stores a backup of data for the one or more clients, a method for backing up the data, the method comprising:
- configuring a backup server to automatically backup one or more of the backup groupings of the client by:
  - receiving input from a user to select one or more of a backup grouping, a writer, or a writer component from the one or more backup groupings;
  - enumerating writers that are active on a client, wherein the writers are grouped into the one or more of the backup groupings;
  - configuring the backup server to automatically backup one or more writers in the backup groupings; and
  - configuring the backup server to automatically backup some writer components of the one or more writers in the backup grouping; and
- backing up data of the client associated with the selected backup grouping, writer, or writer component.

25. A method as defined in claim 24, wherein configuring a backup server further comprises disabling a writer such that the writer is not backed up.

26. A method as defined in claim 24, wherein configuring a backup server further comprises enumerating one or more volumes for backup.

27. A method as defined in claim 24, further comprising backing up an application that does not have a writer together with one or more other applications of a backup grouping that each have a writer.

28. A method as defined in claim 24, further comprising providing a visual indication illustrating an individual selectability of the one or more writers and the writer components in the backup groupings.

* * * * *

UNITED STATES PATENT AND TRADEMARK OFFICE
CERTIFICATE OF CORRECTION

| | | |
|---|---|---|
| PATENT NO. | : 7,346,799 B2 | |
| APPLICATION NO. | : 10/935551 | |
| DATED | : March 18, 2008 | |
| INVENTOR(S) | : Carolina P. Uhlmann et al. | |

It is certified that error appears in the above-identified patent and that said Letters Patent is hereby corrected as shown below:

The title page showing an illustrative figure should be deleted and substitute therefor the attached title page.

(12) United States Patent
Uhlmann et al.

(10) Patent No.: US 7,346,799 B2
(45) Date of Patent: Mar. 18, 2008

(54) SYSTEMS AND METHODS FOR RECOVERING AND BACKING UP DATA

(75) Inventors: Carolina P. Uhlmann, Seattle, WA (US); Eric A. Herrmann, Snohomish, WA (US); Dianne C. Thompson, Bellevue, WA (US); Janet L. Schneider, Bellevue, WA (US); Patrick M. Simonich, Kent, WA (US)

(73) Assignee: EMC Corporation, Hopkinton, MA (US)

(*) Notice: Subject to any disclaimer, the term of this patent is extended or adjusted under 35 U.S.C. 154(b) by 645 days.

(21) Appl. No.: 10/935,551

(22) Filed: Sep. 7, 2004

(65) Prior Publication Data

US 2006/0053332 A1 Mar. 9, 2006

(51) Int. Cl.
*G06F 11/00* (2006.01)

(52) U.S. Cl. .................................... 714/2; 714/6

(58) Field of Classification Search .......... 714/2, 714/6, 15
See application file for complete search history.

(56) References Cited

U.S. PATENT DOCUMENTS

| | | |
|---|---|---|
| 6,865,655 B1 | 3/2005 | Andersen |
| 6,910,112 B2 | 6/2005 | Berkowitz et al. |
| 6,948,038 B2 | 9/2005 | Berkowitz et al. |
| 7,162,599 B2 | 1/2007 | Berkowitz et al. |
| 2003/0182301 A1 | 9/2003 | Patterson et al. |
| 2004/0010487 A1* | 1/2004 | Prahlad et al. ............. 707/1 |
| 2004/0236916 A1* | 11/2004 | Berkowitz et al. ......... 711/162 |
| 2004/0250033 A1* | 12/2004 | Prahlad et al. ............. 711/162 |
| 2005/0015663 A1 | 1/2005 | Armangau et al. |
| 2005/0028022 A1 | 2/2005 | Amano |
| 2005/0081099 A1 | 4/2005 | Chang et al. |
| 2007/0005914 A1 | 1/2007 | Thompson et al. |
| 2007/0005915 A1 | 1/2007 | Thompson et al. |
| 2007/0006017 A1 | 1/2007 | Thompson et al. |
| 2007/0006018 A1 | 1/2007 | Thompson et al. |

OTHER PUBLICATIONS

How VERITAS Storage Foundation™ for Windows Integrates with and Enhances Windows Server 2003 Volume Shadow Copy Service. VERITAS Software Corporation. Nov. 20, 2003.*
Legato NetWorker Administrator's Guide Release 6.0. Legato Systems, Inc. Aug. 2000. pp. 276,312,502.*

(Continued)

*Primary Examiner*—Scott Baderman
*Assistant Examiner*—Paul F Contino
(74) *Attorney, Agent, or Firm*—Workman Nydegger

(57) ABSTRACT

Systems and methods for recovering data from a backup copy and for backing up data. When a recovery operation is initiated, recovery items are selected from backup groupings of the client. The recovery items can include backup groupings, writers, and writer components. After the recovery items are selected, backed up metadata for each selected writer is retrieved from the backed up data. The backed up metadata is then queried to identify the restore method of the writer. The data of the client is then recovered by implementing the restore method included in the backed up metadata of the writer. During a backup operation, some of the backup groupings, as well as the content of the backup groupings, can be individually selected for backup. In both backup and recovery, a visual indication may be provided to identify individual selectability.

28 Claims, 7 Drawing Sheets

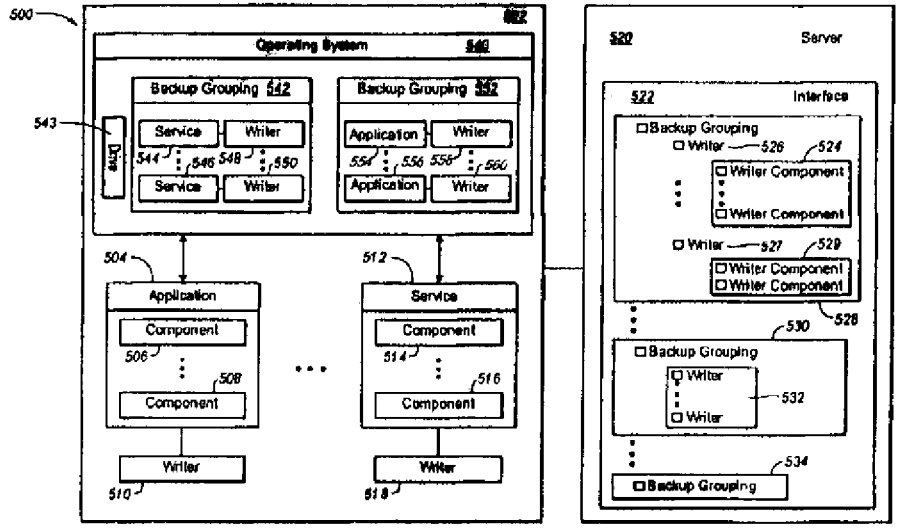

UNITED STATES PATENT AND TRADEMARK OFFICE
CERTIFICATE OF CORRECTION

| | | |
|---|---|---|
| PATENT NO. | : 7,346,799 B2 | Page 3 of 6 |
| APPLICATION NO. | : 10/935551 | |
| DATED | : March 18, 2008 | |
| INVENTOR(S) | : Carolina P. Uhlmann et al. | |

It is certified that error appears in the above-identified patent and that said Letters Patent is hereby corrected as shown below:

Drawings
Sheet 1, replace Fig. 1 with the figure depicted below, wherein Client is labeled with --108-- and Storage is labeled with --109--.

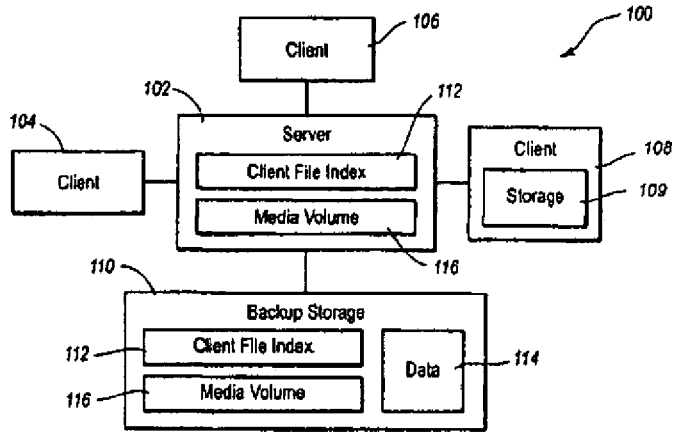

Fig. 1

UNITED STATES PATENT AND TRADEMARK OFFICE
CERTIFICATE OF CORRECTION

| | | |
|---|---|---|
| PATENT NO. | : 7,346,799 B2 | Page 4 of 6 |
| APPLICATION NO. | : 10/935551 | |
| DATED | : March 18, 2008 | |
| INVENTOR(S) | : Carolina P. Uhlmann et al. | |

It is certified that error appears in the above-identified patent and that said Letters Patent is hereby corrected as shown below:

Sheet 3, replace Figure 3B with the figure below, wherein "System Root" is changed to --System Boot--.

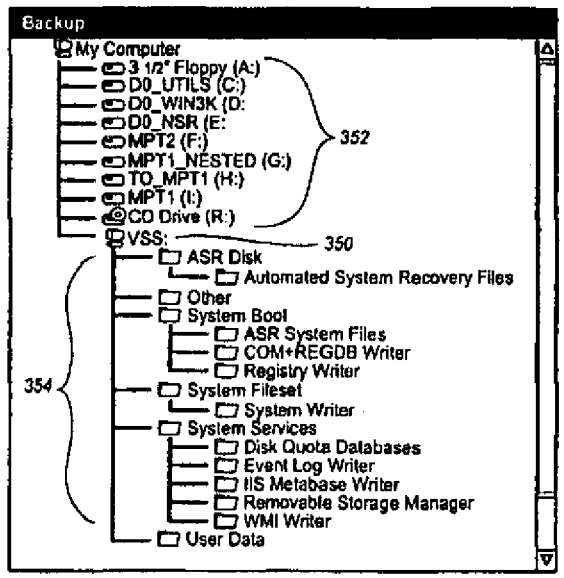

*Fig. 3B*

UNITED STATES PATENT AND TRADEMARK OFFICE
CERTIFICATE OF CORRECTION

| | | |
|---|---|---|
| PATENT NO. | : 7,346,799 B2 | Page 5 of 6 |
| APPLICATION NO. | : 10/935551 | |
| DATED | : March 18, 2008 | |
| INVENTOR(S) | : Carolina P. Uhlmann et al. | |

It is certified that error appears in the above-identified patent and that said Letters Patent is hereby corrected as shown below:

Sheet 6, replace Figure 5 with the figure depicted below wherein in Back Grouping 552, "Service" has been changed to --Application-- and has been labeled with --554-- and --556--; Writer has been labeled with --558-- and --560--. And also wherein in 512 "Application" has been changed to --Service--.

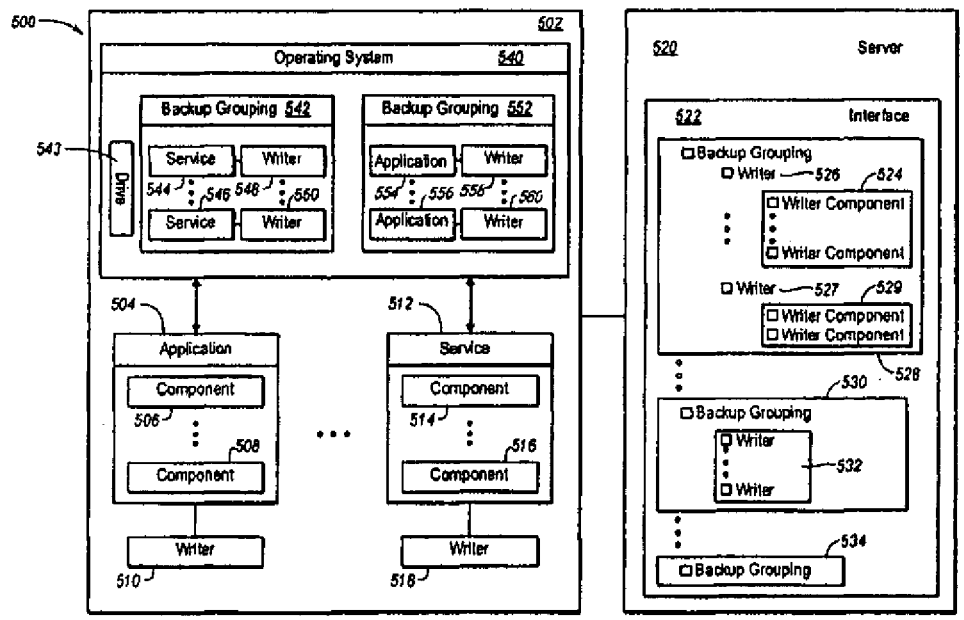

UNITED STATES PATENT AND TRADEMARK OFFICE
CERTIFICATE OF CORRECTION

PATENT NO. : 7,346,799 B2
APPLICATION NO. : 10/935551
DATED : March 18, 2008
INVENTOR(S) : Carolina P. Uhlmann et al.

It is certified that error appears in the above-identified patent and that said Letters Patent is hereby corrected as shown below:

Column 1
Line 66, change "In addition." to --In addition,--

Column 3
Line 53, change "102, 104, and/or 106" to --104, 106, and/or 108--

Column 4
Line 52, change "202. 204" to --202 and 204--
Line 61, change "Wash." to --Washington--

Column 5
Line 62, change "In, the" to --The--

Column 6
Lines 43-44, change "In one example. at" to --At--

Signed and Sealed this

Seventh Day of April, 2009

JOHN DOLL
*Acting Director of the United States Patent and Trademark Office*